(12) United States Patent
Janson et al.

(10) Patent No.: US 7,309,301 B2
(45) Date of Patent: Dec. 18, 2007

(54) TRANSAXLE HAVING A DIFFERENTIAL MECHANISM AND ON-DEMAND TRANSFER CLUTCH

(75) Inventors: David Janson, Plymouth, MI (US); Andy Perakes, Canton, MI (US); Dennis Person, Canton, MI (US); Gregory Goleski, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 11/255,793

(22) Filed: Oct. 21, 2005

(65) Prior Publication Data
US 2007/0093346 A1    Apr. 26, 2007

(51) Int. Cl.
*F16H 37/08* (2006.01)
*F16H 48/06* (2006.01)
*B60K 17/354* (2006.01)

(52) U.S. Cl. .................. 475/200; 475/221; 180/247
(58) Field of Classification Search ............. 475/200, 475/202, 204, 206, 221, 222, 84, 86, 91, 475/93, 99, 100, 101, 120; 180/247
See application file for complete search history.

(56) References Cited

U.S. PATENT DOCUMENTS

| | | | |
|---|---|---|---|
| 3,894,446 A | 7/1975 | Snoy et al. | |
| 4,364,285 A | 12/1982 | Morisawa et al. | |
| 4,635,744 A * | 1/1987 | Hiraiwa | 180/249 |
| 4,727,966 A | 3/1988 | Hiramatsu et al. | |
| 5,083,635 A * | 1/1992 | Tashiro | 180/248 |
| 5,234,091 A * | 8/1993 | Kobayashi et al. | 192/85 CA |
| 5,377,800 A * | 1/1995 | Sperduti et al. | 192/85 CA |
| 5,644,916 A * | 7/1997 | Hayasaki | 60/436 |
| 6,595,086 B2 * | 7/2003 | Kobayashi | 74/665 T |
| 6,655,138 B2 * | 12/2003 | Shaw et al. | 60/545 |
| 6,752,742 B2 | 6/2004 | Shigeta et al. | |
| 6,878,085 B2 | 4/2005 | Matsuno | |

FOREIGN PATENT DOCUMENTS

| | | |
|---|---|---|
| EP | 0480887 | 4/1992 |
| EP | 0524717 | 1/1993 |
| GB | 2030246 | 4/1980 |
| GB | 2189854 | 11/1987 |
| JP | 02092729 | 4/1990 |
| JP | 02290724 | 11/1990 |

* cited by examiner

*Primary Examiner*—Roger Pang
(74) *Attorney, Agent, or Firm*—David B. Kelley; MacMillan, Sobanski & Todd, LLC

(57) ABSTRACT

A powertrain for transmitting power to the drive wheels of a vehicle includes a transaxle case containing a transaxle drive mechanism for producing variable ratios of a speed of its output and a speed of its input, a differential mechanism for transmitting power between the output and the wheels of a first set of drive wheel, a transfer clutch secured to the output for transmitting power between the output and the wheels of a second set of drive wheels, and a control system for hydraulically actuating the transfer clutch.

10 Claims, 3 Drawing Sheets

TRANSAXLE HAVING A DIFFERENTIAL MECHANISM AND ON-DEMAND TRANSFER CLUTCH

BACKGROUND OF THE INVENTION

The present invention relates generally to drive apparatus for transmitting power continually to the front wheels of a motor vehicle and, upon demand, to the rear wheels. More particularly, the invention pertains to a transaxle that contains an inter-wheel differential and an actively controlled, on-demand clutch.

In the powertrain of an all-wheel drive motor vehicle, whose engine and transaxle are transversely mounted in an engine compartment at the front of the vehicle, it is conventional for the transaxle case to contain a bevel-pinion differential mechanism, which is driven from the transmission's output and is driveably connected to the front halfshafts. The space that is enclosed by the transaxle case is relatively small. But an open, bevel gear differential mechanism requires a relatively large volume in the transaxle case. To overcome this difficulty, an additional component, a rear drive unit (RDU) such as a transfer case, is located in the driveline between the transaxle and a rear differential. The RDU contains an on-demand transfer clutch assembly, which transmits a portion of the torque to the rear axles depending on the degree to which the clutch is slipping or fully engaged.

The on-demand clutch couples a rear drive shaft to the transaxle output. These coupler assemblies require a pump, hydraulic control bodies, electronic controllers and lubrication systems, which are located in the transaxle, to control and actuate the on-demand clutch in the RDU. If, however, the components that produce the function of the RDU or transfer case could be integrating with the transaxle case, the powertrain would have fewer components, lower cost and improved operating reliability.

SUMMARY OF THE INVENTION

A powertrain according to this invention for transmitting power to the drive wheels of a vehicle includes a transaxle case containing a transaxle drive mechanism for producing variable ratios of a speed of its output and a speed of its input, a differential mechanism for transmitting power between the output and the wheels of a first set of drive wheel, a transfer clutch secured to the output for transmitting power between the output and the wheels of a second set of drive wheels, and a control system for hydraulically actuating the transfer clutch.

The powertrain replaces the open front differential in the transaxle case with an assembly that includes an open differential and a hydraulically controlled on-demand transfer clutch. The differential is used between the outputs to the front wheels and transmits equal toque to the right and left wheels. The on-demand transfer clutch couples the transmission output to the rear output independently of the front differential. Although the open differential illustrated in FIG. 2 is a compound planetary gearset, it could also be a bevel gear differential.

The on-demand transfer clutch is controlled hydraulically using the same control system that is used to operate the automatic transaxle thereby eliminating redundant components, minimizing the required space, and reducing manufacturing and assembly cost. No transfer case is required in a powertrain according to this invention.

The transfer clutch can be controlled with dual gain using one on/off solenoid, one variable force solenoid, one pressure regulator valve, and one gain control valve. The hydraulic circuit is supplied with transaxle line pressure and a controlled solenoid feed pressure. If solenoid feed is unavailable, a regulator valve is used to produce regulated solenoid feed pressure. A simpler circuit can be used for a single gain clutch.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
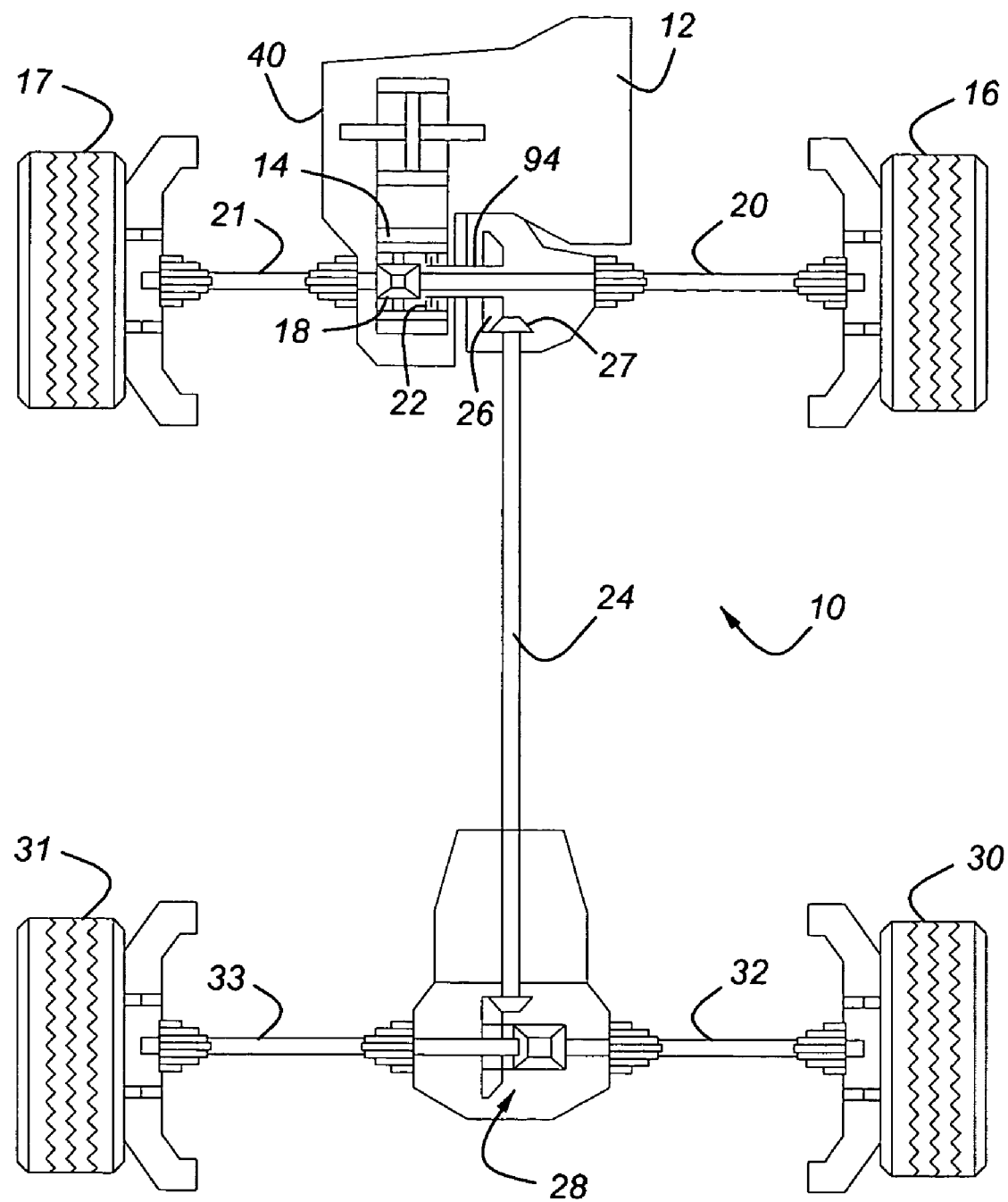
FIG. 1 is a top view of a motor vehicle driveline for transmitting power between a transaxle and the vehicle wheels.

FIG. 1 illustrates a motor vehicle powertrain 10 to which the present invention can be applied. The powertrain shown there is for an all-wheel drive vehicle whose engine and transaxle 12 are transversely mounted in an engine compartment at the front of the vehicle. The transaxle 12 produces multiple forward and reverse ratios of the speed of its output 14, which is continuously driveably connected to front wheels 16, 17, to the speed of its input, which is driveably connected to an engine crankshaft.

An inter-wheel differential mechanism 18, located in the transaxle case, transmits power differentially to a right-side halfshaft 20 and to a left-side halfshaft 21, which are connected to the wheels 16, 17, respectively. An on-demand transfer clutch 22, also located in the transaxle case, transmits power selectively between the transaxle output 14 and driveshaft 24 through a bevel pinion 26 and a mating bevel gear 27 secured to the drive shaft. The degree to which clutch 22 is engaged, slipping or disengaged determines the torque capacity of the clutch and the magnitude of torque transmitted to the driveshaft 24. Drive shaft 24 transmits power to a rear inter-wheel differential mechanism 28, from which power is transmitted differentially to the rear wheels 30, 31 through axle shafts or halfshafts 32, 33, respectively.

Figure 2:
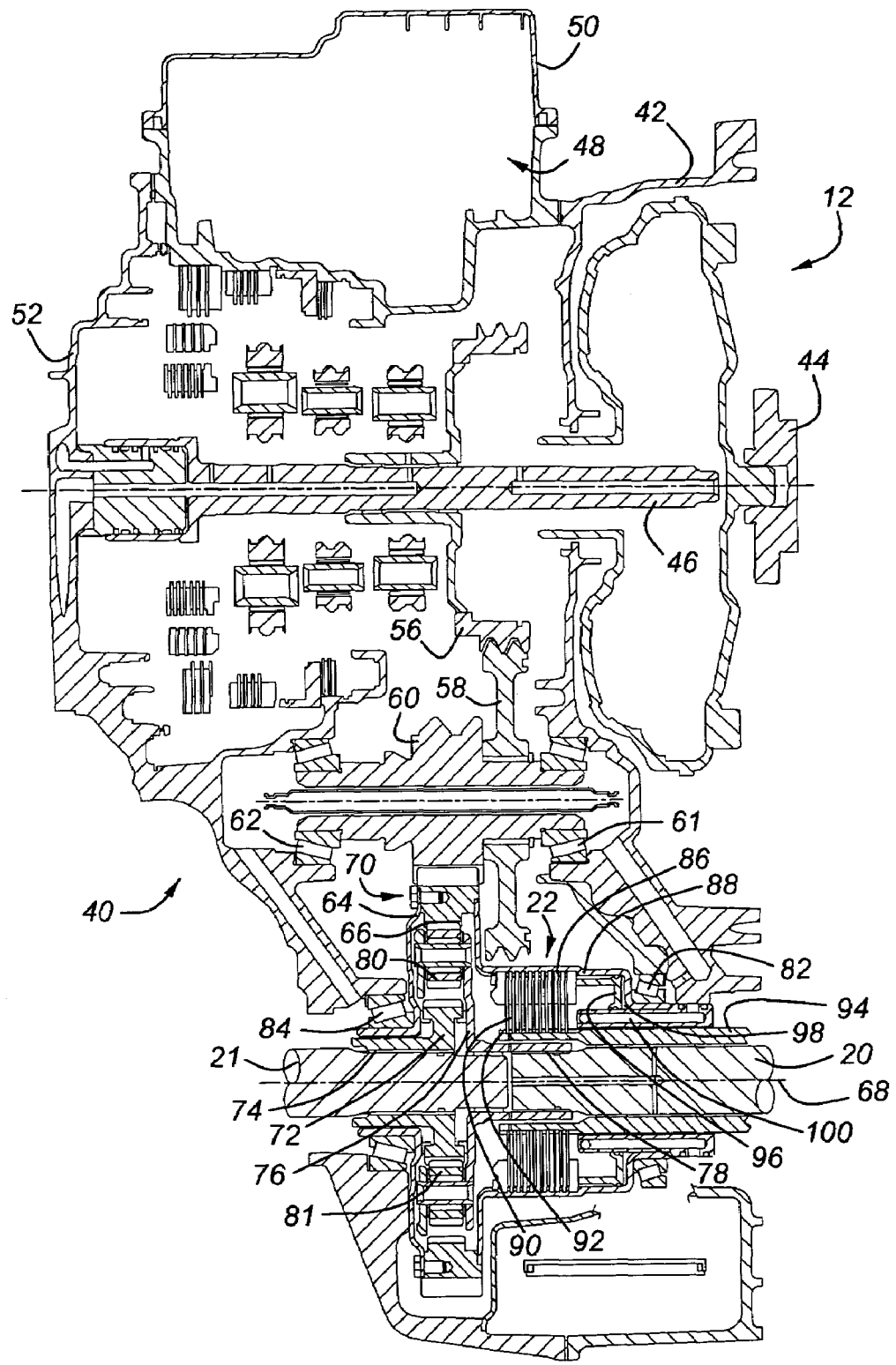
FIG. 2 is a partial cross section through the transaxle case showing details of the front inter-wheel differential mechanism and a transfer clutch.

Referring now to FIG. 2, the transaxle 12 is located in a transaxle case 40, which is preferably a machined casting of aluminum or magnesium formed in several case sections secured mutually at hydraulically sealed, bolted connections. A torque converter case section 42 contains a torque converter, which produces a hydrokinetic connection between the crankshaft 44 of an engine, or the shaft of another power source, such as a motor shaft, and the transaxle input shaft 46. A valve body 48, located in a valve body case 50, which is secured to the torque converter case 42, contains hydraulic valves, solenoids that control the valves, a connection to the outlet of a hydraulic pump, hydraulic passages that carry fluid to the clutch and brakes from the valves, and other elements of a hydraulic system. A transaxle case segment 52, which is secured to the valve body case section 50, contains several planetary gear units, hydraulically actuated clutches and brakes for controlling the gear units, shafts, and mechanical components interconnecting these components. The transaxle case section 52 containing a front inter-wheel differential, the on-demand transfer clutch 22, and the front halfshafts 20, 21, is secured to the torque converter case section 42 and the gear case segment 52. The front differential may be a bevel gear differential 18, such as that shown in FIG. 1, or a planetary differential mechanism 70, such as that shown in FIG. 2.

Torque at the output 56 of the planetary gear units is transmitted to a wheel 58 supported on and secured to an intermediate shaft 60. Bearings 61, 62 support the intermediate shaft 60 as it rotates on the torque converter casing 42 and casing 52. A wheel 64, driveably connected to intermediate shaft 60, is formed at its inner radial surface with a ring gear 66, concentric about the axis 68 of the halfshafts 20, 21.

The front inter-wheel differential illustrated in FIG. 2 is a planetary differential mechanism 70, which includes a sun gear 72, driveably connected through a spine 74 to the left-side halfshaft 21; a planet pinion carrier 76, driveably secured by a spline 78 to the right-side halfshaft 20; and two sets of planet pinions 80, 81. The members of pinion set 80 are in continuous meshing engagement with ring gear 66 and the members of pinion set 81, and are rotatably supported on the carrier 76. The members of pinion set 88 are in continuous meshing engagement with sun gear 72 and the members of pinion set 80, and are rotatably supported on the carrier 76.

Preferably the ratio of the pitch diameter of ring gear 66 to the pitch diameter of sun gear 72 is 2.0, i.e., the number of ring gear teeth to the number of sun gear teeth is 2.0. With this preferred ratio, one-half of the magnitude of torque transmitted through the differential mechanism 70 is transmitted to the right-side halfshaft 20 and one-half of that torque is transmitted to the left-side halfshaft 21.

The on-demand clutch 22 includes plates 86, splined to the inner surface of a drum 88, which is secured to output member 64, and friction discs 90, interleaved with the plates 86 and splined at 92 to a rear drive output sleeve shaft 94. The ring 64, sun gear 72, both halfshafts 20, 21, and rear output shaft 94 are rotatably supported on the cases 42, 54 by bearings 82, 84. Bevel pinion 26 is secured to the rear output shaft 94, and the bevel pinion 27 is in continuous meshing engagement with bevel gear 26, which transmits power to the rear wheels 30, 31 through driveshaft 24 and the rear differential mechanism 28.

The transfer clutch 22 includes a hydraulically actuated piston 96, which moves leftward forcing the friction discs 90 and plates 86 into mutual frictional engagement when the hydraulic cylinder 98 is pressurized. The clutch cylinder 98 is pressurized and vented through a passage 100 formed of the hydraulic system that controls operation of the transaxle. When cylinder 98 is vented, piston 96 moves rightward allowing the transfer clutch 22 to disengage. In operation, the transfer clutch 22 may slip or fully engage, but the degree to which it is partially or fully engaged determines the magnitude of torque transmitted to the rear wheels 30, 31, and to the front wheels. But the magnitude of torque transmitted to each of the front halfshafts 20, 21 and front wheels 16, 17 is equal.

Figure 3:
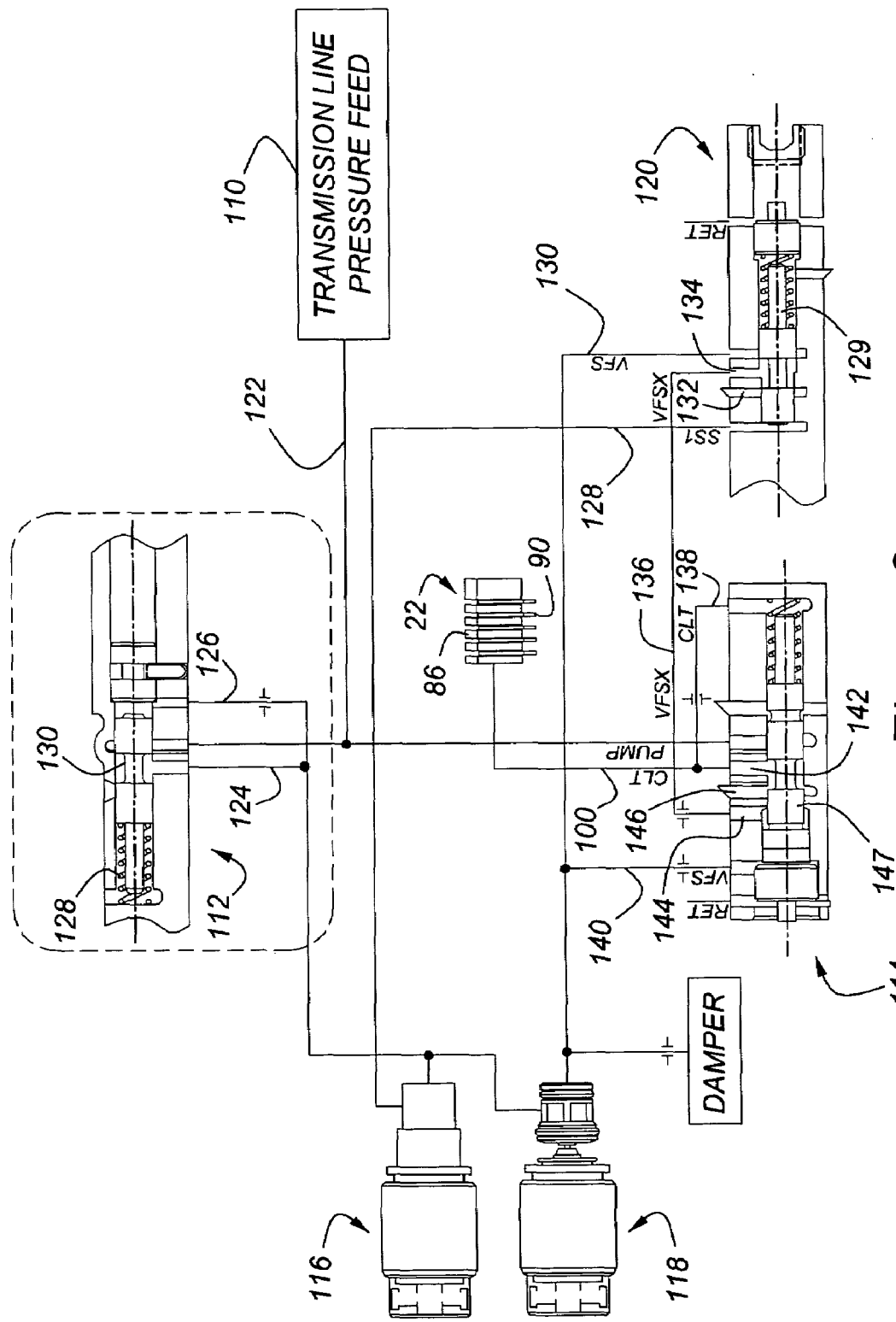
FIG. 3 is schematic diagram of a hydraulic system for controlling the transfer clutch.

A hydraulic system that controls actuation of the on-demand clutch 22 is illustrated in FIG. 3. The hydraulic system is located in the transaxle case 52, particularly in the valve body 48 housed in the valve body case segment 50. Hydraulic pressure at the pump outlet 110 is communicated to a solenoid feed pressure regulator valve 112 and to a transfer clutch pressure regulator valve 114. Regulated solenoid feed pressure produced at the output 124 of the regulator valve 112 is applied to an on-off solenoid valve 116, whose output is either at the regulated pressure or is zero, and to a variable force solenoid valve 118, whose output varies with the magnitude of current supplied to the solenoid that actuates valve 118. Transfer clutch 22 is further controlled by a gain control valve 120.

Pressure at the pump outlet is carried through line 122 to the pressure regulator valve 112. Regulated outlet pressure in line 124 is fed back through line 126 tending to close the valve and to balance the force of a compression spring 128 operating on the spool 130 and tending to open the valve. In this way, valve 112 regulates the magnitude of outlet pressure in line 124 that is communicated to valves 116, 118.

Gain control valve 120 has a high gain state and a low gain state. When valve 116 opens line 124 to line 128 thereby communicating regulated pressure to the SS1 port of valve 120, the low gain state is produced, in which spool 129 is forced rightward against its compression spring and opens a connection between the outlet of valve 118 through line 130 and line 136. The low gain state produces a variable force in line 136.

When valve 116 closes line 124 to line 128 thereby preventing communicating of regulated pressure to the SS1 port of valve 120, the high gain state is produced, in which spool 129 is forced leftward by the compression spring, closing a connection between the outlet of valve 118 and line 136 and opening a connection between the VFSX port 134 and exhaust port 132. The high gain state produces zero pressure in line 136.

Clutch pressure regulator valve 114 includes a VFS port connected by line 140 to valve 118, a VFSF port 144 connected by line 136 to valve 120, an exhaust port 146, an outlet port 142 connected by line 100 to the cylinder 98 of transfer clutch 22, a feedback port connected by line 138 to the clutch pressure outlet 142, and a pump port connected by line 122 to the pump outlet. When gain control valve 120 is in the high gain state, pressure at port 144 is zero, VFS pressure forces the spool 147 rightward against the force applied by the compression spring, causing the valve to modulate outlet port 142 between connections to exhaust port 146 and the pump port depending on the magnitude of VFS pressure and the outlet pressure.

When gain control valve 120 is in the low gain state, pressure at port 144 is present on the differential area of the spool 147, thereby reducing the net effect of the VFS pressure force tending to move the spool rightward against the force applied by the compression spring. This causes a lower magnitude of clutch pressure as valve 114 modulates outlet port 142 between connections to exhaust port 146 and the pump port.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A powertrain for transmitting power to the drive wheels of a vehicle, comprising:
   a transaxle case;
   a transaxle drive mechanism located in the transaxle case including an input and an output, for producing variable ratios of a speed of the output and a speed of the input;

a differential mechanism secured to the output and located in the transaxle case, for transmitting power between the output and a first set of drive wheels; and a transfer clutch located in the transaxle case, secured to the output, for transmitting power between the output and the wheels of a second set of drive wheels; and a control system located in the transaxle case for hydraulically actuating the transfer clutch and including a source of hydraulic feed pressure; pressure regulator valve for producing a source of regulated hydraulic pressure in response to the hydraulic feed pressure; a first solenoid-operated valve communicating with the source of regulated hydraulic pressure, for alternately opening and closing communication between a high-low pressure output and the source of regulated hydraulic pressure; a second solenoid-operated valve communicating with the source of regulated hydraulic pressure, for producing a variable pressure output; a transfer gain control valve communicating with the high-low pressure output and variable pressure output, for outputting a relatively low pressure when the first solenoid-operated valve is closed and a variable pressure when the first solenoid-operated valve is open; and a clutch pressure regulator valve communicating with the output of the transfer gain control valve, the variable pressure output produced by the second solenoid-operated valve, and the source of hydraulic feed pressure for regulating clutch pressure.

2. The powertrain of claim 1, further comprising:
a first shaft driveably connected to a first drive wheel;
a second shaft driveably connected to a second drive wheel; and
wherein the differential mechanism further comprises a planetary gearset including a ring gear driveably secured to the output, a sun gear driveably connected to the first shaft a pinion carrier driveably connected to the second shaft, and a set of planet pinions rotatably supported on the carrier and in meshing engagement with the sun gear and ring gear.

3. The powertrain of claim 1, further comprising:
a first shaft driveably connected to a first drive wheel;
a second shaft driveably connected to a second drive wheel; and
wherein the differential mechanism is a bevel gear differential including bevel gears driveably connected to the output a first side bevel gear in meshing engagement with the bevel gears and driveably connected to the first shaft, and a second bevel gear in meshing engagement with the bevel gears and driveably connected to the second shaft.

4. The powertrain of claim 1, further comprising:
a rear output shaft;
wherein the transfer clutch includes friction discs driveably connected to the rear output shaft, friction plates driveably connected to the output, interleaved with the friction discs for frictionally engaging and disengaging the friction discs and producing a releasable drive connection between the output and the rear output shaft driveshaft.

5. The powertrain of claim 1, further comprising:
a rear output shaft extending laterally from the differential mechanism;
driveshaft extending longitudinally from die transaxle and driveably connected to a second set of drive wheels; and
a rear drive bevel pinion secured to the rear output shaft;

a rear drive bevel gear meshing with the rear drive bevel pinion and driveably connected to the driveshaft; and wherein the transfer clutch includes friction discs driveably connected to the rear output shaft, friction plates driveably connected to the output, interleaved with the friction discs for frictionally engaging and disengaging the friction discs and producing a releasable drive connection between the output and the rear output shaft driveshaft.

6. A powertrain for transmitting power to the drive wheels of a vehicle, comprising:
a transaxle case;
a first shaft driveably connected to a first drive wheel;
a second shaft driveably connected to a second drive wheel; and
a transaxle drive mechanism located in the transaxle case including an input and an output, for producing variable ratios of a speed of the output and a speed of the input;
a differential mechanism located in the transaxle case, including a ring gear driveably secured to the output, a sun gear driveably connected to the first shaft, a pinion carrier driveably connected to the second shaft, and a set of planet pinions rotatably supported on the carrier and in meshing engagement with the sun gear and ring gear, for transmitting torque from the output to a first set of drive wheels;
a transaxle clutch located in the transaxle case, secured to the output, for transmitting power between the output and the wheels of a second set of drive wheels; and
a control system located in the transaxle case for hydraulically actuating the transfer clutch and including a source of hydraulic feed pressure; pressure regulator valve producing a source of regulated hydraulic pressure in response to the hydraulic pressure; a first solenoid-operated valve communicating with the source of regulated hydraulic pressure, for alternately opening and closing communication between a high-low pressure output and the source of regulated hydraulic pressure; a second solenoid-operated valve communicating with the source of regulated hydraulic pressure, for producing a variable pressure output; a transfer gain control valve communicating with the high-low pressure output and variable pressure output, for outputting a relatively low pressure when the first solenoid-operated valve is closed and a variable pressure when the first solenoid-operated valve is open; and a clutch pressure regulator valve communicating with an output of the transfer gain control valve, the variable pressure output produced by the second solenoid-operated valve, and the source of hydraulic feed pressure, for regulating clutch pressure.

7. The powertrain of claim 6 wherein a pitch diameter of the ring gear is substantially two times greater than a pitch diameter of the sun gear.

8. The powertrain of claim 6, wherein clutch pressure regulator valve produces a dual gain regulated clutch pressure.

9. The powertrain of claim 6, further comprising:
a rear output shaft;
wherein the transfer clutch includes friction discs driveably connected to the rear output shaft, friction plates driveably connected to the output, interleaved with the friction discs for frictionally engaging and disengaging the friction discs and producing a releasable drive connection between the output and the rear output shaft driveshaft.

10. The powertrain of claim 6, further comprising:
a rear output shaft extending laterally from the differential mechanism;
driveshaft extending longitudinally from the transaxle and driveably connected to a second set of drive wheels; and
a rear drive bevel pinion secured to the rear output shaft;
a rear drive bevel gear meshing with the rear drive bevel pinion and driveably connected to the driveshaft; and wherein the transfer clutch includes friction discs driveably connected to the rear output shaft, friction plates driveably connected to the output, interleaved with the friction discs for frictionally engaging and disengaging the friction discs and producing a releasable drive connection between the output end the rear output shaft driveshaft.

* * * * *